United States Patent
Bayod et al.

(10) Patent No.: US 10,208,660 B2
(45) Date of Patent: Feb. 19, 2019

(54) VARIABLE NOZZLE UNIT AND VARIABLE GEOMETRY TURBOCHARGER

(71) Applicant: IHI Corporation, Koto-ku (JP)

(72) Inventors: Jose Javier Bayod, Tokyo (JP); Koutarou Itou, Tokyo (JP); Taiki Yoshizaki, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/369,053

(22) Filed: Dec. 5, 2016

(65) Prior Publication Data

US 2017/0082018 A1    Mar. 23, 2017

Related U.S. Application Data

(63) Continuation of application No. PCT/JP2015/067733, filed on Jun. 19, 2015.

(30) Foreign Application Priority Data

Jul. 4, 2014 (JP) ................. 2014-138474

(51) Int. Cl.
*F02B 37/22* (2006.01)
*F04D 27/00* (2006.01)
(Continued)

(52) U.S. Cl.
CPC .............. *F02B 37/22* (2013.01); *F01D 5/04* (2013.01); *F01D 9/02* (2013.01); *F01D 17/165* (2013.01);
(Continued)

(58) Field of Classification Search
CPC ............ F01D 17/165; F01D 9/02; F01D 5/04; F01D 25/24; F05D 2220/40;
(Continued)

(56) References Cited

U.S. PATENT DOCUMENTS

| | | |
|---|---|---|
| 2006/0188368 A1 | 8/2006 | Jinnai et al. |
| 2010/0008766 A1 | 1/2010 | Scholz et al. |

(Continued)

FOREIGN PATENT DOCUMENTS

| | | |
|---|---|---|
| CN | 101978136 A | 2/2011 |
| JP | 3-92502 | 9/1991 |

(Continued)

OTHER PUBLICATIONS

International Search Report dated Aug. 4, 2015 in PCT/JP2015/067733, filed on Jun. 19, 2015 ( with English Translation).

(Continued)

*Primary Examiner* — Mark A Laurenzi
*Assistant Examiner* — Wesley G Harris
(74) *Attorney, Agent, or Firm* — Oblon, McClelland, Maier & Neustadt, L.L.P.

(57) ABSTRACT

A support ring is connected to a first nozzle ring by multiple connecting pins. An outer cutout is formed at a region on an outer side in a radial direction at a rim on an axially one side of each first attachment hole in the first nozzle ring. An inner cutout is formed at a region on an inner side in the radial direction at the rim on the axially one side of each first attachment hole in the first nozzle ring. An outer cutout is formed at a region on an outer side in the radial direction at a rim on an axially other side of each pin hole in the support ring. An inner cutout is formed at a region on an inner side in the radial direction at the rim on the axially other side of each pin hole in the support ring.

6 Claims, 12 Drawing Sheets

(51) Int. Cl.
| | |
|---|---|
| *F02B 37/24* | (2006.01) |
| *F01D 5/04* | (2006.01) |
| *F01D 9/02* | (2006.01) |
| *F01D 25/24* | (2006.01) |
| *F01D 17/16* | (2006.01) |
| *F02C 6/12* | (2006.01) |

(52) U.S. Cl.
CPC .............. *F01D 25/24* (2013.01); *F02B 37/24* (2013.01); *F02C 6/12* (2013.01); *F04D 27/002* (2013.01); *F05D 2220/40* (2013.01); *F05D 2260/50* (2013.01); *Y02T 10/144* (2013.01)

(58) Field of Classification Search
CPC ...... F05D 2260/50; F02B 37/24; F02B 37/22; F02C 6/12; F04D 27/002; Y02T 10/144
See application file for complete search history.

(56) References Cited

U.S. PATENT DOCUMENTS

| | | | |
|---|---|---|---|
| 2011/0014033 A1* | 1/2011 | Boning | F01D 17/165 415/148 |
| 2015/0211538 A1 | 7/2015 | Aiba et al. | |
| 2015/0354444 A1* | 12/2015 | Hayashi | F02B 37/24 415/148 |

FOREIGN PATENT DOCUMENTS

| | | |
|---|---|---|
| JP | 2005-163873 | 6/2005 |
| JP | 2006-220053 | 8/2006 |
| JP | 2007-205311 | 8/2007 |
| JP | 2009-243300 | 10/2009 |
| JP | 2009-243431 | 10/2009 |
| JP | 2013-130116 | 7/2013 |
| JP | 2013-245655 A | 12/2013 |
| JP | 2014-34910 A | 2/2014 |
| WO | WO 2014/024905 A1 | 2/2014 |

OTHER PUBLICATIONS

Written Opinion dated Aug. 4, 2015 in PCT/JP2015/067733, filed on Jun. 19, 2015.
Combined Chinese Office Action and Search Report dated May 28, 2018 in Patent Application No. 201580033614.2 (with English translation of Categories of Cited Documents).
Office Action dated Apr. 17, 2018, in corresponding Japanese Patent Application No. 2014-138474 (with partial English translation).
Japanese Office Action dated Oct. 2, 2018 in Patent Application No. 2014-138474.

* cited by examiner

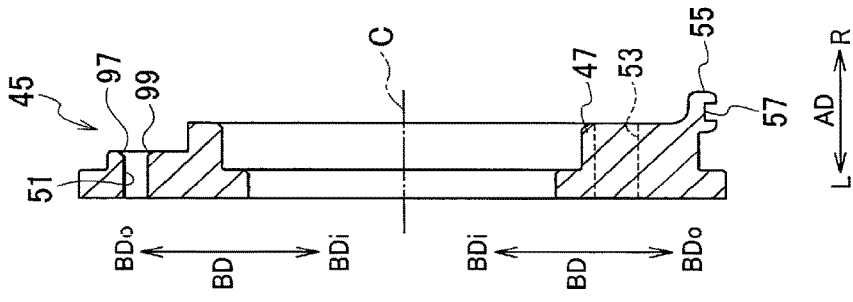
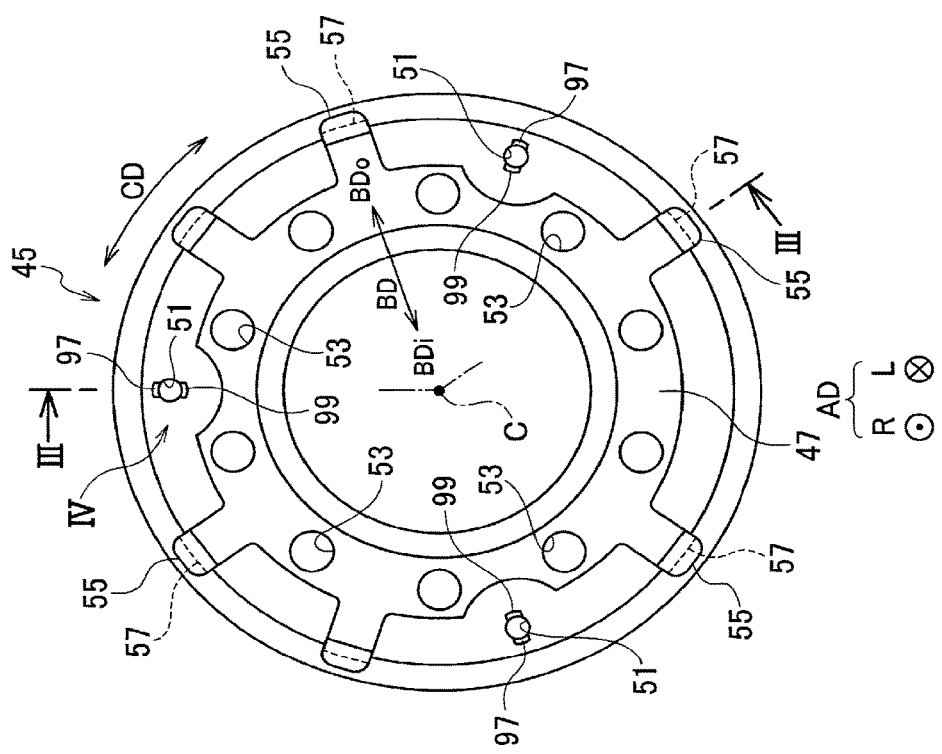

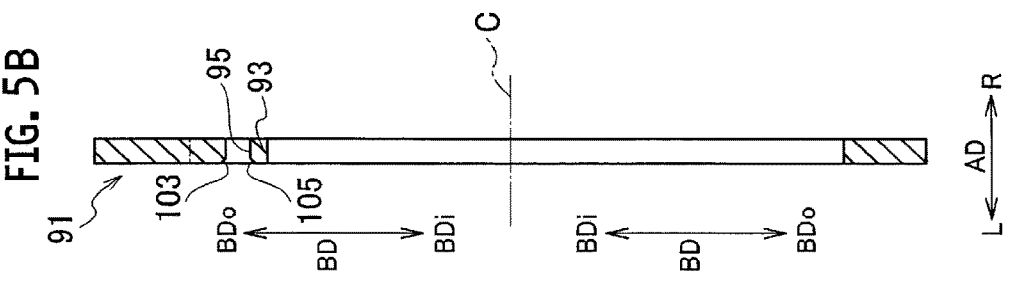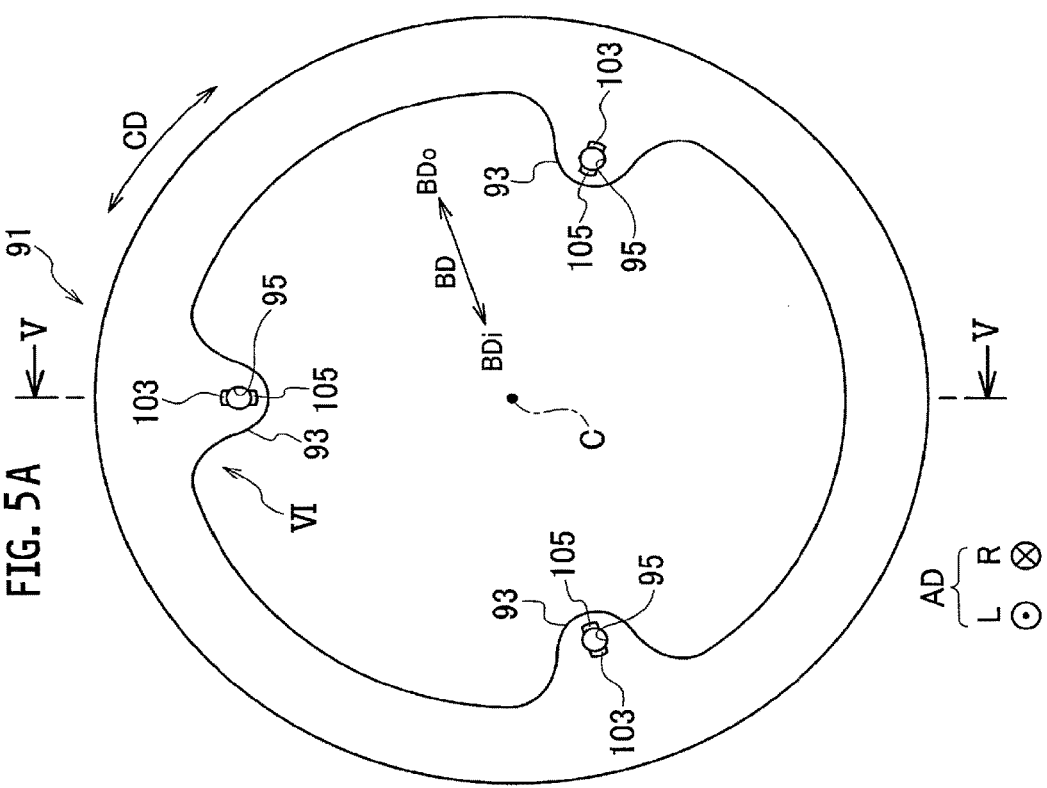

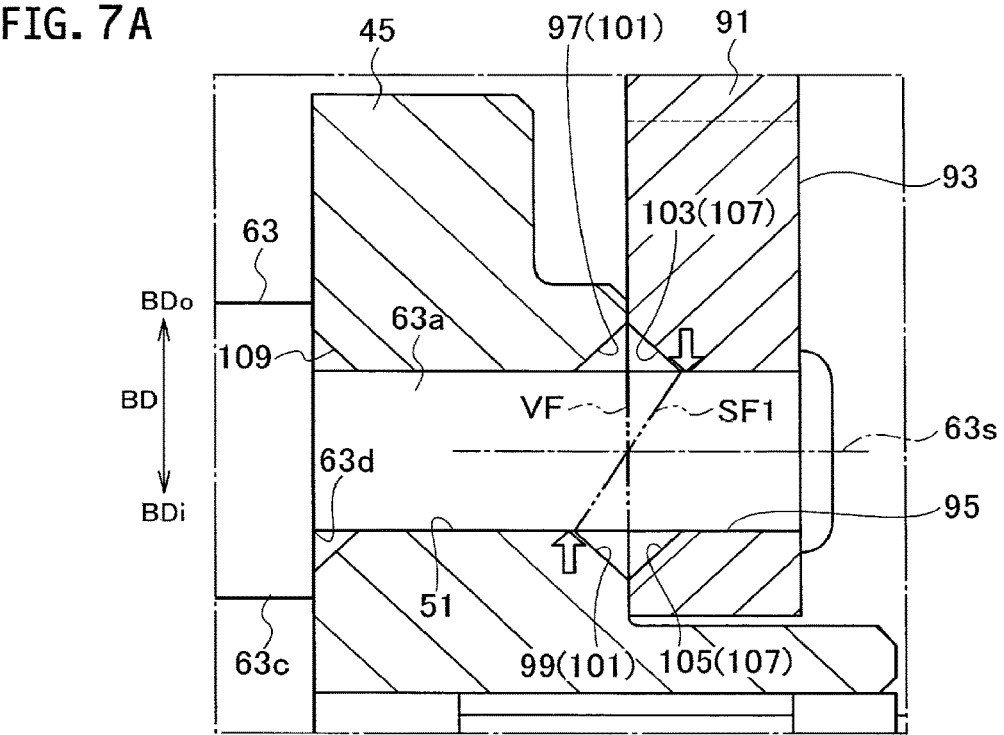
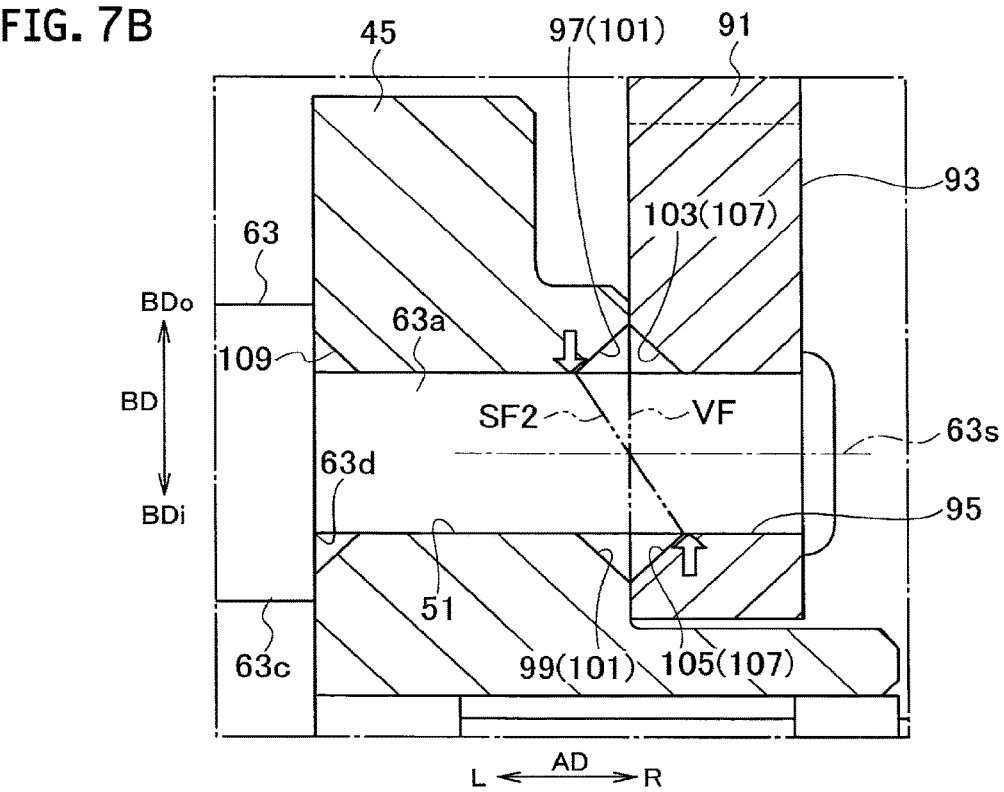

VARIABLE NOZZLE UNIT AND VARIABLE GEOMETRY TURBOCHARGER

CROSS REFERENCE TO RELATED APPLICATIONS

This application is a continuation application of International Application No. PCT/JP2015/067733, filed on Jun. 19, 2015 which claims priority to Japanese Patent Application No. 2014-138474, filed on Jul. 4, 2014 the entire contents of which are incorporated by reference herein.

BACKGROUND

1. Technical Field

The present disclosure relates to a variable nozzle unit and the like, which adjusts a passage area for (a flow rate of) an exhaust gas to be supplied to a turbine wheel side of a variable geometry turbocharger.

2. Description of the Related Art

A variable geometry turbocharger is equipped with a variable nozzle unit, which adjusts a passage area for (a flow rate of) an exhaust gas to be supplied to a turbine wheel side. Related techniques are illustrated in Japanese Patent Application Publication No. 2009-243431 (PTL 1) and Japanese Patent Application Publication No. 2009-243300 (PTL 2). A specific configuration of a variable nozzle unit according to the related technique is as described below.

Inside a turbine housing, a first nozzle ring serving as an annular first wall member is disposed concentrically with a turbine wheel. Multiple first attachment holes are penetratingly formed (formed in a penetrating manner) in this first nozzle ring at intervals in a circumferential direction (a predetermined circumferential direction). Meanwhile, a second nozzle ring serving as an annular second wall member is provided integrally with the first nozzle ring at a position away in an axial direction (in an axial direction of the turbine wheel) from the first nozzle ring. Multiple second attachment holes are penetratingly formed in this second nozzle ring at intervals in the circumferential direction so as to be aligned with the multiple first attachment holes in the first nozzle ring.

Multiple connecting pins are provided in an integrally connected manner between the first nozzle ring and the second nozzle ring. The multiple connecting pins are arranged at intervals in the circumferential direction (the predetermined circumferential direction). One end portion (one end portion in an axial direction) of each connecting pin is joined in an inserted state to the corresponding first attachment hole in the first nozzle ring. Another end portion (another end portion in the axial direction) of each connecting pin is joined in an inserted state to the corresponding second attachment hole in the second nozzle ring. A side surface on an axially one side of an intermediate portion of each connecting pin comes into contact with an opposed surface of the first nozzle ring. A side surface on an axially other side of the intermediate portion of each connecting pin comes into contact with an opposed surface of the second nozzle ring.

Multiple variable nozzles are disposed at regular intervals in the circumferential direction (the predetermined circumferential direction) between the opposed surface of the first nozzle ring and the opposed surface of the second nozzle ring. Each variable nozzle is turnable in forward and reverse directions (opening and closing directions) around a shaft center (a shaft center of a nozzle shaft of the variable nozzle) which is parallel to a shaft center of the turbine wheel. A link mechanism for turning the multiple variable nozzles synchronously in the forward and reverse directions is disposed in a link chamber that is defined and formed on an opposite surface side from the opposed surface of the first nozzle ring. A passage area (a throat area) for an exhaust gas to be supplied to the turbine wheel side is increased when the multiple variable nozzles are turned synchronously in the forward direction (the opening direction). On the other hand, the passage area for the exhaust gas to be supplied to the turbine wheel side is reduced when the multiple variable nozzles are turned synchronously in the reverse direction (the closing direction).

A support ring having a diameter greater than an outside diameter of the first nozzle ring is provided on the opposite surface from the opposed surface of the first nozzle ring. An inner edge portion (an inner peripheral edge portion) of the support ring is integrally connected by joining of one end portions of the multiple connecting pins. Multiple pin holes (third attachment holes) for allowing insertion of the one end portions of the connecting pins are penetratingly formed in the inner edge portion of the support ring at intervals in the circumferential direction so as to be aligned with the multiple first attachment holes in the first nozzle ring. An outer edge portion (an outer peripheral edge portion) of the support ring is attached to a bearing housing in a sandwiched state in cooperation with the turbine housing.

SUMMARY

Depending on an operating condition of the variable geometry turbocharger, an ambient temperature of the first nozzle ring (an ambient gas temperature) may become very high as compared to an ambient temperature of the support ring. On the other hand, the ambient temperature of the first nozzle ring may become low as compared to the ambient temperature of the support ring. In other words, a difference in ambient temperature (a difference in ambient gas temperature) between the first nozzle ring and the support ring may occur when the variable geometry turbocharger is in operation. Hence, a difference in thermal expansion in a radial direction between the first nozzle ring and the support ring may occur as a consequence. Due to the difference in thermal expansion, a shear stress acts on a plane (a shear plane) perpendicular to the shaft center of each connecting pin at the one end portion of the connecting pin.

Furthermore, along with requirements from the engine side, the difference in ambient temperature between the first nozzle ring and the support ring may be increased when the variable geometry turbocharger is in operation. In this case, there is a concern over an effect on the shear stress acting on the one end portion of each connecting pin depending on the operating condition of the variable geometry turbocharger.

According to the present disclosure, it is possible to provide a variable nozzle unit, which is capable of suppressing an effect on the shear stress acting on the one end portion of each connecting pin even in the case of the increase in the difference in ambient temperature between the first wall member and the support ring when the variable geometry turbocharger is in operation.

According to a technical aspect of the present disclosure, a variable nozzle unit configured to adjust a passage area for an exhaust gas to be supplied to a turbine wheel side of a variable geometry turbocharger includes: an annular first wall member being disposed inside a turbine housing of the variable geometry turbocharger and concentrically with the turbine wheel, and including multiple attachment holes penetratingly formed intervals in a circumferential direction;

an annular second wall member provided at a position located away from and opposed to the first wall member in an axial direction; multiple connecting pins provided in an integrally connected manner between the first wall member and the second wall member and arranged at intervals in the circumferential direction, in which one end portion (one end portion in the axial direction) of each connecting pin is joined in a state of being inserted into the corresponding attachment hole in the first wall member; multiple variable nozzles disposed between an opposed surface of the first wall member and an opposed surface of the second wall member at intervals in the circumferential direction (a predetermined circumferential direction), each variable nozzle being turnable in forward and reverse directions around a shaft center (a shaft center of a nozzle shaft of the variable nozzle) parallel to a shaft center of the turbine wheel; a link mechanism configured to synchronously turn the multiple variable nozzles; and a support ring (an annular support member) provided on an opposite surface from the opposed surface of the first wall member, and integrally connected to the first wall member by joining of the one end portions of the multiple connecting pins, the support ring including: multiple pin holes to allow insertion of the one end portions of the connecting pins, the pin holes being penetratingly formed so as to be aligned with the multiple attachment holes in the first wall member, wherein a cutout is formed at at least one of the following regions: any of a region on an outer side in a radial direction and a region on an inner side in the radial direction at a rim on an axially one side of each attachment hole in the first wall member; any of a region on an outer side in the radial direction and a region on an inner side in the radial direction at a rim on an axially other side of each pin hole in the support ring; and any of a region on an outer side in the radial direction and a region on an inner side in the radial direction of an outer peripheral surface at the one end portion of each connecting pin, each region including an alignment part to be aligned with a boundary position between the first wall member and the support ring.

It is to be noted that in the specification and claims of the present application, the expression "disposed" is intended to include a state of being disposed directly as well as a state of being disposed indirectly through a different member. The expression "provided" is intended to include a state of being provided directly as well as a state of being provided indirectly through a different member. The "annular second wall member" may constitute part of the turbine housing and the like. The expression "axial direction" means an axial direction of the turbine wheel (in other words, an axial direction of any of the first wall member, the second wall member, the connecting pin, and the support ring) unless otherwise specified. The expression "axially one side" means one side in the axial direction. The expression "axially other side" means another side in the axial direction. The expression "joining" is intended to include riveting, welding, screwing, and the like. The expression "radial direction" means a radial direction of the turbine wheel (in other words, a radial direction of each of the first wall member, the second wall member, and the support ring) unless otherwise specified.

According to the technical aspect of the present disclosure, if the number of revolutions of the engine is in a high revolution range and a flow rate of the exhaust gas is high when the variable geometry turbocharger is in operation, the multiple variable nozzles are turned synchronously in the forward direction (an opening direction) while operating the link mechanism. Thus, a gas passage area (a throat area) for the exhaust gas to be supplied to the turbine wheel side is increased.

On the other hand, if the number of revolutions of the engine is in a low revolution range and the flow rate of the exhaust gas is low, the multiple variable nozzles are turned synchronously in the reverse direction (a closing direction) while operating the link mechanism. Thus, the gas passage area for the exhaust gas to be supplied to the turbine wheel side is reduced.

The cutout is formed at the region on the outer side in the radial direction at the rim on the one side of each first attachment hole in the first wall member, and on other regions as the case may be. Thus, if a difference in thermal expansion in the radial direction occurs between the first wall member and the support ring when the variable geometry turbocharger is in operation, a shear stress acts on a plane (a shear plane) perpendicular to the shaft center of each connecting pin at the one end portion of the connecting pin. In other words, the shear stress acts on the plane which is larger than the plane perpendicular to the shaft center of the connecting pin at the one end portion of the connecting pin in case of occurrence of the difference in thermal expansion in the radial direction between the first wall member and the support ring when the variable geometry turbocharger is in operation. In addition, a position of action of the shear force from the first wall member and a position of action of the shear force from the support ring are located away from each other in the axial direction of the connecting pin, by amounts corresponding to the cutouts.

According to another technical aspect of the present disclosure, a variable geometry turbocharger configured to supercharge air to be supplied to an engine side by using energy of an exhaust gas from the engine includes the variable nozzle unit according to the technical aspect mentioned earlier.

Accordingly, this technical aspect achieves operation similar to the operation according to the technical aspect mentioned earlier.

BRIEF DESCRIPTION OF DRAWINGS

FIG. 3A is a view showing a first nozzle ring in a variable nozzle unit according to an embodiment of the present disclosure, and FIG. 3B is a cross-sectional view taken along the line in FIG. 3A.

FIG. 5A is a view showing a support ring in the variable nozzle unit according to the embodiment of the present disclosure, and FIG. 5B is a cross-sectional view taken along the V-V line in FIG. 5A.

FIG. 7A and FIG. 7B are cross-sectional views to explain operation of the embodiment of the present disclosure.

Figure 1:
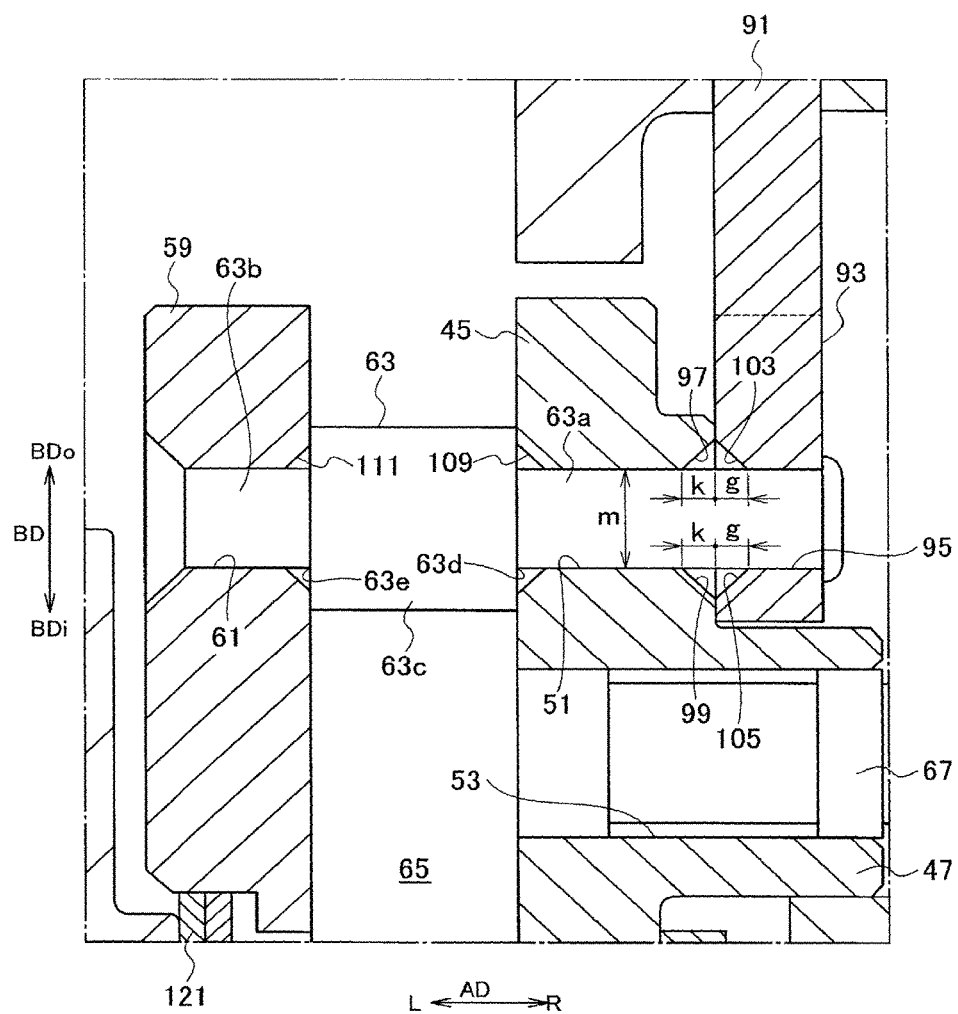
FIG. 1 is an enlarged cross-sectional view of a portion indicated with the arrow I in FIG. 2.

DETAILED DESCRIPTION OF THE EMBODIMENTS (Embodiment of Present Disclosure)

An embodiment of the present disclosure will be described with reference to FIG. 1 to FIG. 12. Here, as shown in the drawings, "L" represents a left direction, "R" represents a right direction, "AD" represents an axial direction, "BD" represents a radial direction, "BDi" represents an inner side in the radial direction, "BDo" represents an outer side in the radial direction, and "CD" represents a circumferential direction, respectively.

Figure 9:
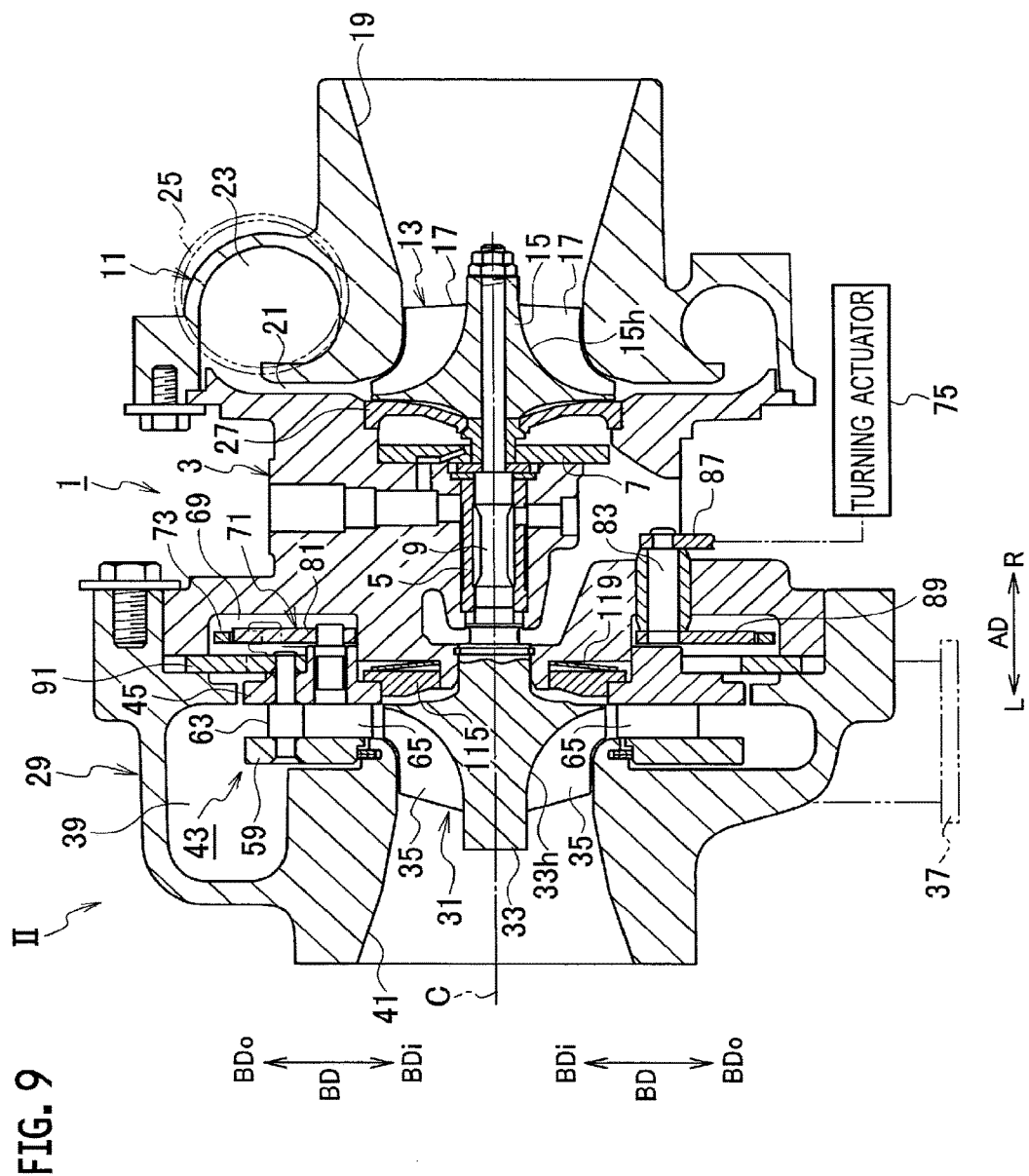
FIG. 9 is a front sectional view of a variable geometry turbocharger according to the embodiment of the present disclosure.

As shown in FIG. 9, a variable geometry turbocharger 1 according to an embodiment of the present disclosure is configured to supercharge (compress) air to be supplied to an engine (not shown) by using pressure energy of an exhaust gas from the engine. A specific configuration and other features of the variable geometry turbocharger 1 are as described below.

The variable geometry turbocharger 1 includes a bearing housing 3. A pair of radial bearings 5 and a pair of thrust bearings 7 are provided inside the bearing housing 3. A rotor shaft (a turbine shaft) 9 extending in a right-left direction is rotatably provided to the multiple bearings 5 and 7. In other words, the rotor shaft 9 is rotatably provided to the bearing housing 3 through the multiple bearings 5 and 7.

A compressor housing 11 is provided on a right side of the bearing housing 3. A compressor wheel 13 configured to compress the air by using a centrifugal force is provided inside the compressor housing 11 in such a way as to be rotatable around its shaft center (a shaft center of the compressor wheel 13) C. The compressor wheel 13 is integrally connected to a right end portion of the rotor shaft 9. The compressor wheel 13 includes a compressor disc 15. A hub surface 15h of the compressor disc 15 extends from the right side to a radially outer side (an outer side in a radial direction of the compressor wheel 13). Multiple compressor blades 17 are integrally formed on the hub surface 15h of the compressor disc 15 at intervals in a circumferential direction (a circumferential direction of the hub surface 15h of the compressor disc 15).

An air intake port 19 for taking the air into the compressor housing 11 is formed on an inlet side (an upstream side in view of a mainstream direction of the air) of the compressor wheel 13 in the compressor housing 11. The air intake port 19 connects to an air cleaner (not shown) configured to clean up the air. An annular diffuser passage 21 configured to boost the compressed air is formed on an outlet side (a downstream side in view of the mainstream direction of the air) of the compressor wheel 13, which is located between the bearing housing 3 and the compressor housing 11. A compressor scroll passage 23 in a scroll shape is formed inside the compressor housing 11. The compressor scroll passage 23 communicates with the diffuser passage 21. An air discharge port 25 for discharging the compressed air to the outside of the compressor housing 11 is formed at an appropriate position of the compressor housing 11. The air discharge port 25 connects to an air intake manifold (not shown) of the engine.

Here, an annular seal plate 27 configured to suppress leakage of the compressed air toward the thrust bearings 7 is provided on a right side portion of the bearing housing 3.

Figure 2:
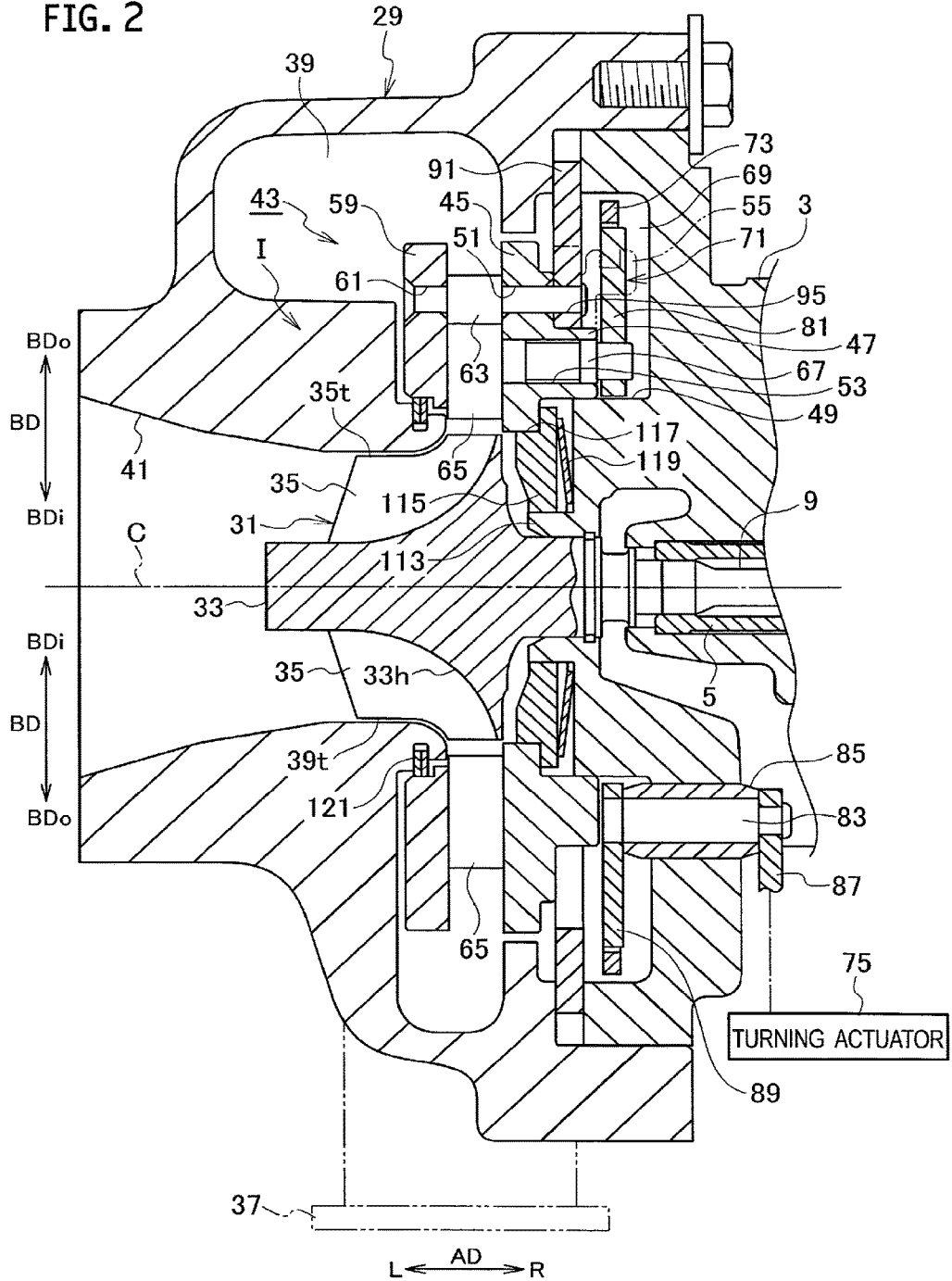
FIG. 2 is an enlarged cross-sectional view of a portion indicated with the arrow II in FIG. 9.

As shown in FIG. 2 and FIG. 9, a turbine housing 29 is provided on a left side of the bearing housing 3. A turbine wheel 31 configured to generate a rotative force by using the pressure energy of the exhaust gas is provided inside the turbine housing 29 in such a way as to be rotatable around its shaft center (a shaft center of the turbine wheel 31) C. The turbine wheel 31 is integrally connected to a left end portion of the rotor shaft 9. The turbine wheel 31 includes a turbine disc 33. A hub surface 33h of the turbine disc 33 extends from the left side (axially one side) to an outer side in a radial direction (an outer side in a radial direction of the turbine wheel 31). Multiple turbine blades 35 are integrally formed on the hub surface 33h of the turbine disc 33 at intervals in a circumferential direction (a circumferential direction of the hub surface 33h of the turbine disc 33).

A gas intake port 37 for taking the exhaust gas into the turbine housing 29 is formed at an appropriate position of the turbine housing 29. The gas intake port 37 is connectable to an exhaust manifold (not shown) of the engine. A turbine scroll passage 39 in a scroll shape is formed on an inlet side (an upstream side in view of a mainstream direction of the exhaust gas) of the turbine wheel 31 inside the turbine housing 29. The turbine scroll passage 39 communicates with the gas intake port 37. A gas discharge port 41 for discharging the exhaust gas is formed on an outlet side (a downstream side in view of a flowing direction of the exhaust gas) of the turbine wheel 31 in the turbine housing 29. The gas discharge port 41 connects to a catalyst (not shown) through a connecting pipe (not shown).

The variable geometry turbocharger 1 is equipped with a variable nozzle unit 43 configured to adjust a passage area for (a flow rate of) the exhaust gas to be supplied to the turbine wheel 31 side. Details of a configuration of the nozzle unit 43 are as described below.

As shown in FIG. 2 and FIGS. 3A and 3B, inside the turbine housing 29, a first nozzle ring 45 serving as an annular first wall member is disposed concentrically with the turbine wheel 31. An annular fitting projection 47 is formed on a right surface of the first nozzle ring 45 in such a way as to project rightward (the axially one side). The fitting projection 47 is supported in a state of being fitted into an annular support portion 49 formed on a left surface of the bearing housing 3. Multiple (at least three) first attachment holes 51 are penetratingly formed (formed in a penetrating manner) in the first nozzle ring 45 at intervals in a circumferential direction (a predetermined circumferential direction). On an inner side in a radial direction of the first attachment holes 51 in the first nozzle ring 45, multiple support holes 53 are penetratingly formed at regular intervals in the circumferential direction. Multiple guide claws 55 are formed at intervals in a circumferential direction (the predetermined circumferential direction) on the fitting projection 47 of the first nozzle ring 45. Each guide claw 55 includes a guide groove 57 with a U-shaped cross section, which is located on a leading end side (an outer side in the radial direction).

As shown in FIG. 2, at a position located away from and opposed to the first nozzle ring 45 in a right-left direction (the axial direction), a second nozzle ring 59 serving as an annular second wall member is provided integrally and concentrically with the first nozzle ring 45. Multiple (at least three) second attachment holes 61 are penetratingly formed in the second nozzle ring 59 at intervals in a circumferential direction (the predetermined circumferential direction) so as to be aligned with the multiple first attachment holes 51 in the first nozzle ring 45. Here, as shown in PTL 1 and PTL 2 discussed above, the second nozzle ring 59 may be provided with a cylindrical shroud portion (not shown) which covers tips 35*t* of the multiple turbine blades 35.

As shown in FIG. 1 and FIG. 2, multiple (at least three) connecting pins 63 are provided in an integrally connected manner between the first nozzle ring 45 and the second nozzle ring 59. The multiple connecting pins 63 are arranged at intervals in a circumferential direction (the predetermined circumferential direction). One end portion (one end portion in an axial direction) 63*a* of each connecting pin 63 is joined by riveting in an inserted state to the corresponding first attachment hole 51 in the first nozzle ring 45. Another end portion (another end portion in the axial direction) 63*b* of each connecting pin 63 is joined by riveting in an inserted state to the corresponding second attachment hole 61 in the second nozzle ring 59.

An intermediate portion (an intermediate portion between the one end portion 63*a* and the other end portion 63*b*) 63*c* of each connecting pin 63 has a diameter greater than outside diameters of the one end portion 63*a* and the other end portion 63*b* of the connecting pin 63. A side surface (a right surface) on an axially one side of the intermediate portion 63*c* of each connecting pin 63 comes into contact with an opposed surface (a left surface) of the first nozzle ring 45. A side surface (a left surface) on an axially other side of the intermediate portion 63*c* of each connecting pin 63 comes into contact with an opposed surface (a right surface) of the second nozzle ring 59. In other words, the multiple connecting pins 63 define a space between the opposed surface of the first nozzle ring 45 and the opposed surface of the second nozzle ring 59.

As shown in FIG. 2, multiple variable nozzles 65 are disposed between the opposed surface of the first nozzle ring 45 and the opposed surface of the second nozzle ring 59, and at regular intervals in a circumferential direction (a predetermined circumferential direction) in such a way as to surround the turbine wheel 31. Each variable nozzle 65 is turnable in forward and reverse directions (opening and closing directions) around a shaft center (a shaft center of the variable nozzle 65) which is parallel to the shaft center C of the turbine wheel 31. A nozzle shaft 67 is integrally formed on a side surface of the axially one side (a right surface) of each variable nozzle 65. Each nozzle shaft 67 is turnably supported by the corresponding support hole 53 in the first nozzle ring 45. Although the multiple variable nozzles 65 are arranged at regular intervals in the circumferential direction, the variable nozzles 65 may be arranged at irregular intervals instead. While each variable nozzle 65 is provided with one nozzle shaft 67, another nozzle shaft (not shown) may also be formed integrally on a side surface of the axially other side (a left surface) of each variable nozzle 65. In this case, the other nozzle shafts will be turnably supported by other support holes (not shown) in the second nozzle ring 59, respectively.

An annular link chamber 69 is defined and formed on an opposite surface side (the right surface side) from the opposed surface of the first nozzle ring 45. A link mechanism 71 for turning the multiple variable nozzles 65 synchronously in the forward and reverse directions (the opening and closing directions) is disposed inside this link chamber 69. A specific configuration of the link mechanism 71 is as described below.

Figure 8:
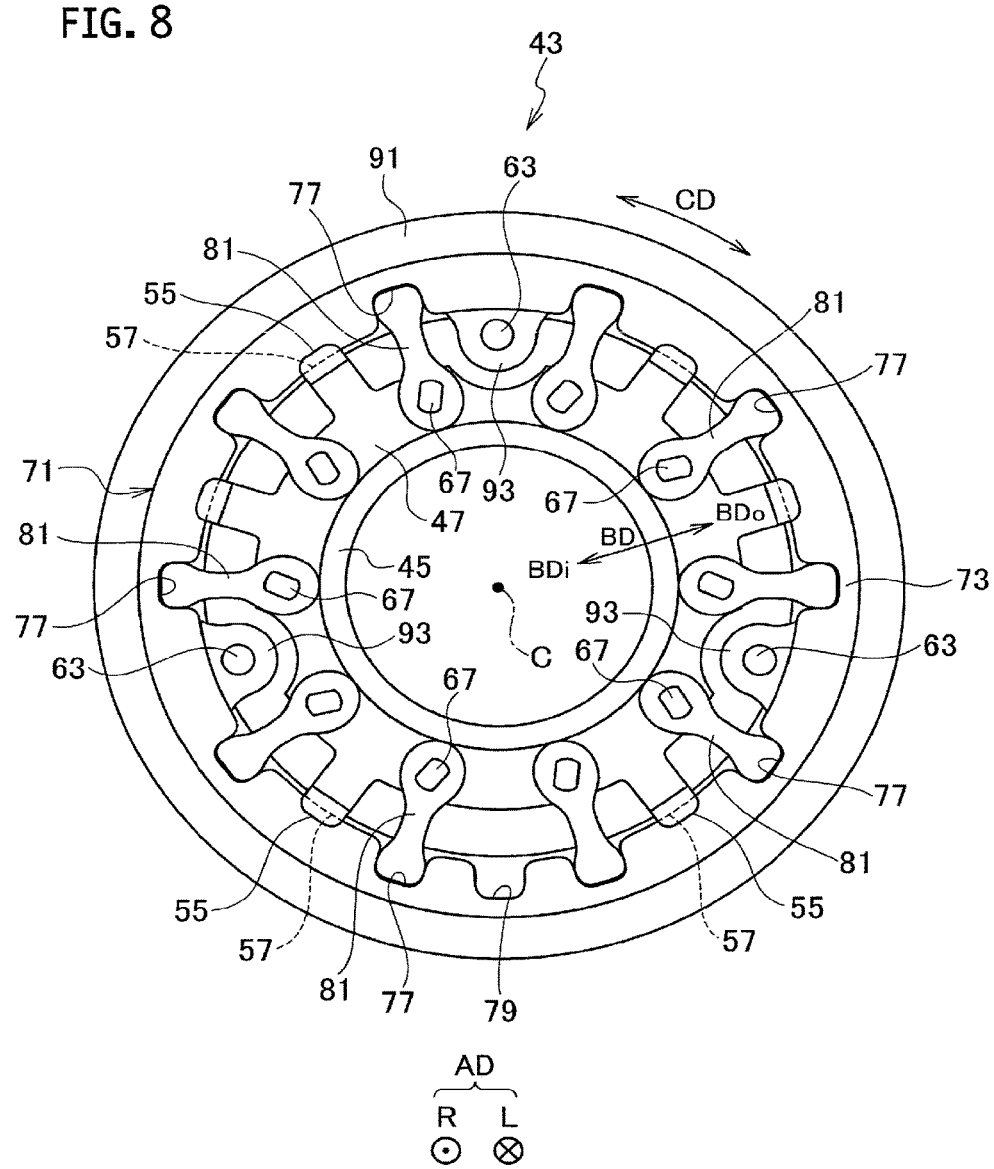
FIG. 8 is a view of the variable nozzle unit according to the embodiment of the present disclosure, which is observed from a link mechanism side.

As shown in FIG. 2 and FIG. 8, a drive ring 73 is provided to the guide grooves 57 of the multiple guide claws 55 of the first nozzle ring 45 in such a way as to be turnable in the forward and reverse directions around the shaft center C of the turbine wheel 31 (the shaft center of the first nozzle ring 45). The drive ring 73 is configured to be turned in the forward and reverse directions by the drive of a turning actuator 75 such as an electric motor and a diaphragm actuator. Multiple (in the same number as the variable nozzles 65) engagement recesses (engagement portions) 77 are formed in the drive ring 73 in such a way as to be recessed outward in the radial direction and located at regular intervals in a circumferential direction (a circumferential direction of the drive ring 73). At an appropriate position of the drive ring 73, a different engagement recess (another engagement portion) 79 is formed in such a way as to be recessed outward in the radial direction. Base portions of nozzle link members 81 are integrally connected to the nozzle shafts 67 of the respective variable nozzles 65. A leading end portion of each nozzle link member 81 is engaged with the corresponding engagement recess 77 in the drive ring 73.

Here, the drive ring 73 may be provided turnably in the forward and reverse directions to a guide ring (not shown) disposed on the opposite surface from the opposed surface of the first nozzle ring 45 as shown in PTL 1 and PTL 2 instead of being provided turnably in the forward and reverse directions in the guide grooves 57 of the multiple guide claws 55 of the first nozzle ring 45. The link mechanism 71 may be disposed on an opposite surface side (a left surface side) from the opposed surface of the second nozzle ring 59 instead of being disposed on the opposite surface side (inside the link chamber 69) from the opposed surface of the first nozzle ring 45. If the multiple variable nozzles 65 are arranged at irregular intervals in the circumferential direction, then the multiple engagement recesses 77 will be arranged at irregular intervals.

As shown in FIG. 2, a drive shaft 83 is provided at a left side portion of the bearing housing 3 in such a way as to be turnable through a bush 85 around a shaft center (a shaft center of the drive shaft 83) parallel to the shaft center of the turbine wheel 31. One end portion (a right end portion) of this drive shaft 83 is connected to the turning actuator 75 through a power transmission mechanism 87. A base end portion of a drive link member 89 is integrally connected to another end portion (a left end portion) of the drive shaft 83. A leading end portion of this drive link member 89 is engaged with the different engagement recess 79 in the drive ring 73.

As shown in FIG. 1, FIG. 2, FIG. 5A, and FIG. 5B, a support ring (an annular support member) 91 having a diameter greater than an outside diameter of the first nozzle ring 45 is provided on the opposite surface (the right surface) from the opposed surface of the first nozzle ring 45. An inner edge portion of the support ring 91 is connected to the first nozzle ring 45 by riveting of the one end portions 63*a* of the multiple connecting pins 63. Multiple (at least three) connecting pieces 93 to be connected to the first nozzle ring 45 are formed on the inner edge portion of the support ring 91 in such a manner as to project radially inward and at intervals in the circumferential direction (the predetermined circumferential direction). A pin hole (a third attachment hole) 95 for allowing insertion of the one end portion 63a of the corresponding connecting pin 63 is penetratingly formed in each connecting piece 93. Each pin hole 95 is aligned with the corresponding first attachment hole 51 in the first nozzle ring 45.

In other words, the multiple pin holes 95 are penetratingly formed in the inner edge portion of the support ring 91 at the intervals in the circumferential direction so as to be aligned with the multiple first attachment holes 51 in the first nozzle ring 45. Moreover, an outer edge portion of the support ring 91 is attached to the bearing housing 3 in a state of being sandwiched in cooperation with the turbine housing 29. In this way, a displacement (slight movement) in the radial direction with respect to the bearing housing 3 is permitted to the outer edge portion of the support ring 91. Here, the outer edge portion of the support ring 91 may be attached to the bearing housing 3 by using an attachment bolt (not shown) instead of being attached in the state of being sandwiched in cooperation with the turbine housing 29.

Next, configurations of a characteristic part and its surrounding parts of the variable nozzle unit 43 will be described.

Figure 4A:
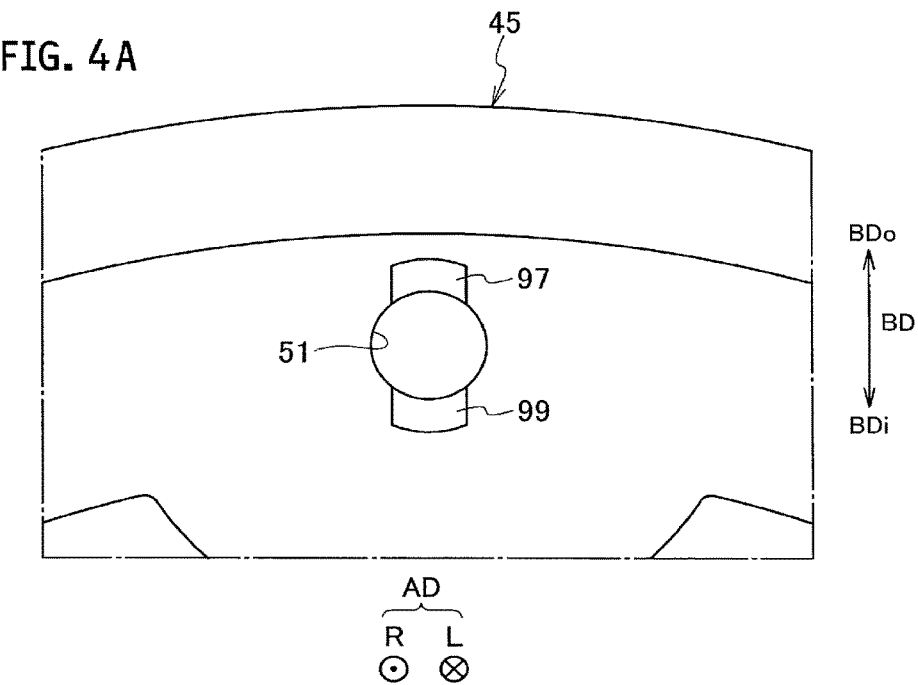
FIG. 4A is an enlarged view of a portion indicated with the arrow IV in FIG. 3A.
Figure 4B:
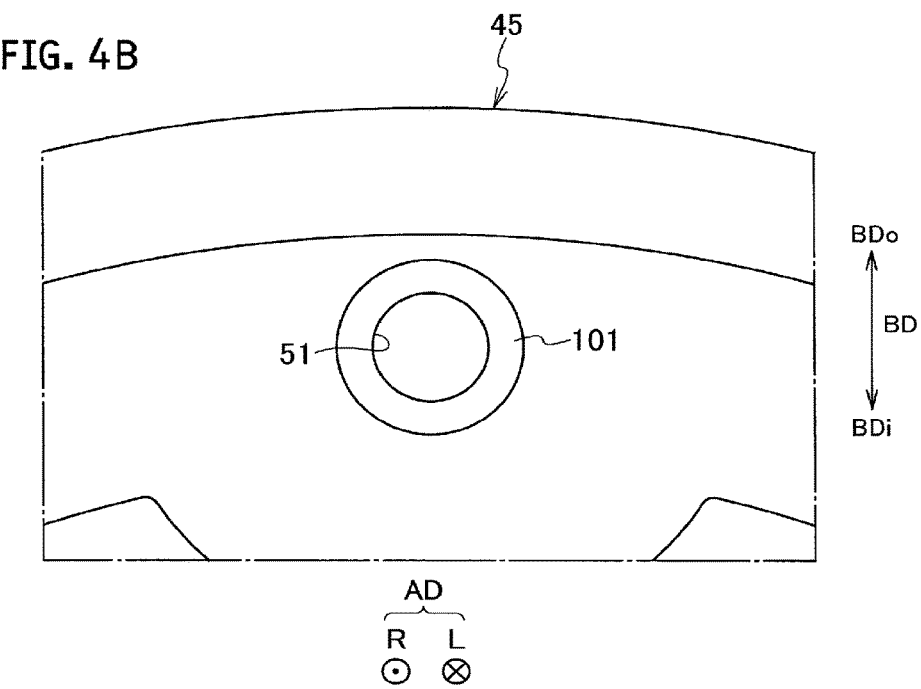
FIG. 4B is a view showing a state in which a chamfer serving as one of the cutouts is formed at a rim on an axially one side of a first attachment hole in the first nozzle ring.

As shown in FIG. 1, FIG. 3A, FIG. 3B, and FIG. 4A, an outer cutout 97 is formed at a region on an outer side in the radial direction of a rim on the axially one side (a right side) of each first attachment hole 51 in the first nozzle ring 45. An inner cutout 99 is formed at a region on an inner side in the radial direction of the rim on the axially one side of each first attachment hole 51 in the first nozzle ring 45. Instead of forming the outer cutout 97 and the inner cutout 99 at the rim on the axially one side of each first attachment hole 51 in the first nozzle ring 45, a chamfer 101 serving as one of the cutouts may be formed as shown in FIG. 4B in consideration of ease of processing.

Here, a length k in the axial direction of each of the outer cutout 97, the inner cutout 99, and the chamfer 101 is set equal to or above 0.1 times of an outside diameter m of the one end portion 63a of the connecting pin 63, or preferably equal to or above 0.3 times thereof. As for the reason, the length k is so set that a shear stress is allowed to act on a plane that is sufficiently larger than a plane VF in the one end portion 63a of the connecting pin 63, the plane VF being perpendicular to a shaft center 63s of the connecting pin 63, in case a difference in thermal expansion in the radial direction occurs between the first nozzle ring 45 and the support ring 91 when the variable geometry turbocharger 1 is in operation (see FIG. 7A and FIG. 7B).

Figure 6A:
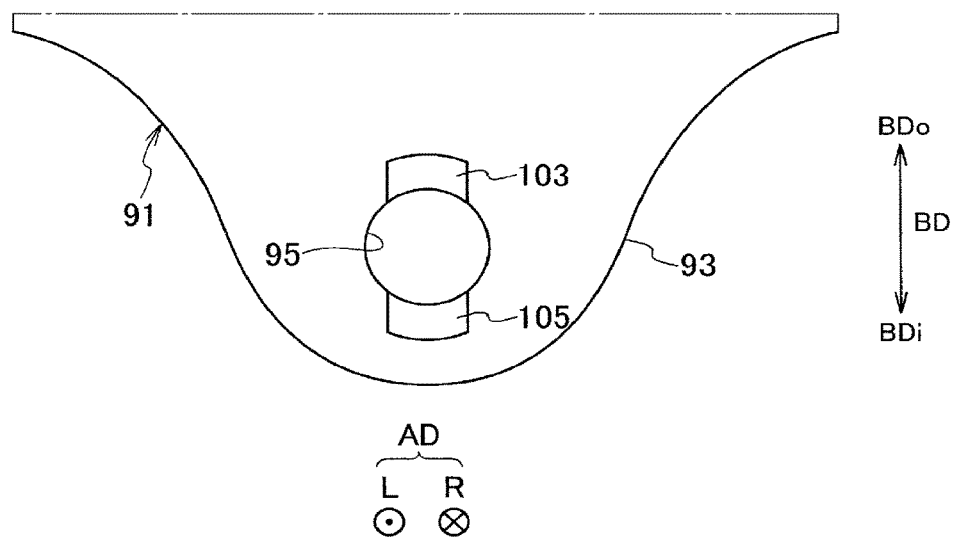
FIG. 6A is an enlarged view of a portion indicated with the arrow VI in FIG. 5A.
Figure 6B:
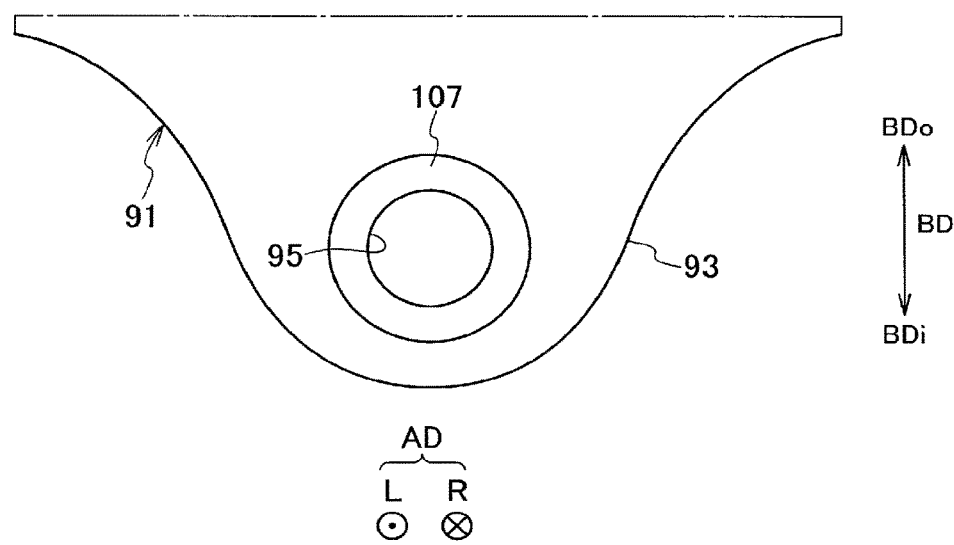
FIG. 6B is a view showing a state in which a chamfer serving as one of the cutouts is formed at a rim on an axially other side of a pin hole in the support ring.

As shown in FIG. 1, FIG. 5A, FIG. 5B, and FIG. 6A, an outer cutout 103 is formed at a region on an outer side in the radial direction at a rim on the axially other side (a left side) of each pin hole 95 in the support ring 91. An inner cutout 105 is formed at a region on an inner side in the radial direction at the rim on the axially other side of each pin hole 95 in the support ring 91. Instead of forming the outer cutout 103 and the inner cutout 105 at the rim on the axially other side of each pin hole 95 in the support ring 91, a chamfer 107 serving as one of the cutouts may be formed as shown in FIG. 6B in consideration of ease of processing. Here, a length g in the axial direction of each of the outer cutout 103, the inner cutout 105, and the chamfer 107 is set equal to or above 0.1 times of the outside diameter m of the one end portion 63a of the connecting pin 63, or preferably equal to or above 0.3 times thereof due to the same reason as the reason for setting the length k in the axial direction of the outer cutout 97 and the like.

As shown in FIG. 1, a chamfer 109 is formed at a rim on the axially other side (the left side) of each first attachment hole 51 in the first nozzle ring 45. A chamfer 111 is formed at a rim on the axially one side (the right side) of each second attachment hole 61 in the second nozzle ring 59. Here, a chamfer (not shown) may also be formed at a rim on the axially one side (the right side) of each pin hole 95 in the support ring 91.

As shown in FIG. 2, an annular projection 113 is formed at an inner edge portion of the support portion 49 of the bearing housing 3 in such a way as to protrude leftward (toward the axially other side). An annular heat shield plate 115 to shield heat from the turbine wheel 31 side is provided and fitted to the projection 113. An annular fitting step portion 117 is formed on an outer edge portion (an outer peripheral edge portion) of the heat shield plate 115 in such a way as to recede inward in the radial direction. This fitting step portion 117 is fitted to an inner edge portion of the first nozzle ring 45. On a right side of the heat shield plate 115 at the projection 113 of the bearing housing 3, there is provided a disc spring 119 configured to bias the first nozzle ring 45 leftward so as to pressure-bond the fitting step portion 117 of the heat shield plate 115 and the inner edge portion of the first nozzle ring 45. Multiple seal rings 121, which suppress leakage of the exhaust gas from the opposite surface side (the left surface side) from the opposed surface of the second nozzle ring 59, are provided between an inner peripheral surface of the second nozzle ring 59 and an appropriate position of the turbine housing 29.

Subsequently, the operation and effect of the embodiment of the present disclosure will be described.

The exhaust gas is taken in from the gas intake port 37 and flows from the inlet side to the outlet side of the turbine wheel 31 through the turbine scroll passage 39. Thus, a rotative force is generated by the pressure energy of the exhaust gas, so that the rotor shaft 9 and the compressor wheel 13 rotate integrally with the turbine wheel 31. As a consequence, the air taken in from the air intake port 19 is compressed, and the compressed air is discharged from the air discharge port 25 through the diffuser passage 21 and the compressor scroll passage 23, and is supplied to the engine accordingly.

If the number of revolutions of the engine is high and a flow rate of the exhaust gas is high when the variable geometry turbocharger 1 is in operation, the multiple variable nozzles 65 are turned synchronously in the forward direction (the opening direction) while operating the link mechanism 71 by using the turning actuator 75. Thus, it is possible to supply a large amount of the exhaust gas by increasing the passage area (the throat area) for the exhaust gas to be supplied to the turbine wheel 31 side. On the other hand, if the number of revolutions of the engine is low and the flow rate of the exhaust gas is low, the multiple variable nozzles 65 are turned synchronously in the reverse direction (the closing direction) while operating the link mechanism 71 by using the turning actuator 75. Thus, it is possible to increase a flow velocity of the exhaust gas by reducing the passage area for the exhaust gas to be supplied to the turbine wheel 31 side, and to secure a sufficient work output from the turbine wheel 31. As a consequence, the turbine wheel 31 can generate the rotative force sufficiently and stably irrespective of whether the flow rate of the exhaust gas is high or low.

The rim on the axially one side of each first attachment hole 51 in the first nozzle ring 45 is provided with the outer cutout 97 and the inner cutout 99 (or the chamfer 101), and the rim on the axially other side of each pin hole 95 in the support ring 91 is provided with the outer cutout 103 and the inner cutout 105 (or the chamfer 107). For this reason, a shear stress acts on a plane (a shear plane) SF1 or SF2 (see FIG. 7A or FIG. 7B), which is inclined so as to correspond to any of the lengths k and g in the axial direction with respect to the plane VF in the one end portion 63a of the connecting pin 63, the plane VF being perpendicular to the shaft center 63s of the connecting pin 63, due to the difference in thermal expansion in the radial direction between the first nozzle ring 45 and the support ring 91 occurring when the variable geometry turbocharger 1 is in operation.

Specifically, if the thermal expansion in the radial direction occurring in the first nozzle ring 45 is greater than the thermal expansion in the radial direction occurring in the support ring 91, then as shown in FIG. 7A, a radially outward shear force is generated from the first nozzle ring 45 and a radially inward shear force is generated from the support ring 91, respectively (see outline arrows), whereby the shear stress acts on the inclined plane (the shear plane) SF1 in the one end portion 63a of the connecting pin 63.

If the thermal expansion in the radial direction occurring in the support ring 91 is greater than the thermal expansion in the radial direction occurring in the first nozzle ring 45, then as shown in FIG. 7B, a radially inward shear force is generated from the first nozzle ring 45 and a radially outward shear force is generated from the support ring 91, respectively (see outline arrows), whereby the shear stress acts on the inclined plane (the shear plane) SF2 in the one end portion 63a of the connecting pin 63.

Accordingly, the shear stress acts on the plane SF1 or SF2 in the one end portion 63a of the connecting pin 63, which is larger than the plane VF perpendicular to the shaft center 63s of the connecting pin 63, in case of occurrence of the difference in thermal expansion in the radial direction between the first nozzle ring 45 and the support ring 91 when the variable geometry turbocharger 1 is in operation. As a consequence, it is possible to suppress a shear strain in the radial direction which would occur at the one end portion 63a of the connecting pin 63.

In the meantime, a position of action of the shear force from the first nozzle ring 45 and a position of action of the shear force from the support ring 91 are located away from each other in the axial direction of the connecting pin 63, by amounts corresponding to the outer cutouts 97 and 103, the inner cutouts 99 and 105, and so forth. Thus, even if a difference in ambient temperature between the first nozzle ring 45 and the support ring 91 is increased when the variable geometry turbocharger 1 is in operation, it is possible to suppress an increase in the shear stress acting on the one end portion 63a of the connecting pin 63.

The chamfer 109 is formed at the rim on the axially other side of each first attachment hole 51 in the first nozzle ring 45. For this reason, a boundary portion 63d between the one end portion 63a and the intermediate portion 63c of the connecting pin 63 is kept from contact with a sharp region (see FIG. 1). Likewise, the chamfer 111 is formed at the rim on the axially one side of each second attachment hole 61 in the second nozzle ring 59. For this reason, a boundary portion 63e between the other end portion 63b and the intermediate portion 63c of the connecting pin 63 is unlikely to come into contact with a sharp region (see FIG. 1). In this way, even if a stress concentration occurs in any of the boundary portions 63d and 63e of the connecting pin 63 due to the difference in thermal expansion in the radial direction between the first nozzle ring 45 and the support ring 91 depending on an operating condition of the variable geometry turbocharger 1, it is possible to suppress a shear strain by relaxing the stress concentration.

As a consequence, according to the embodiment of the present disclosure, even if the difference in ambient temperature between the first nozzle ring 45 and the support ring 91 is increased when the variable geometry turbocharger 1 is in operation, it is possible to suppress the increase in the shear stress acting on the one end portion 63a of the connecting pin 63. Meanwhile, even if the stress concentration occurs in any of the boundary portions 63d and 63e of the connecting pin 63 due to the difference in thermal expansion in the radial direction between the first nozzle ring 45 and the support ring 91 depending on the operating condition of the variable geometry turbocharger 1, it is still possible to relax the stress concentration.

(Modified Example of Embodiment of Present Disclosure)

The following configuration may be adopted instead of forming the outer cutout 97 and the like at the rim on the axially one side of each first attachment hole 51 in the first nozzle ring 45 and forming the outer cutout 103 and the like at the rim on the axially other side of each pin hole 95 in the support ring 91 (see FIG. 1).

Figure 10:
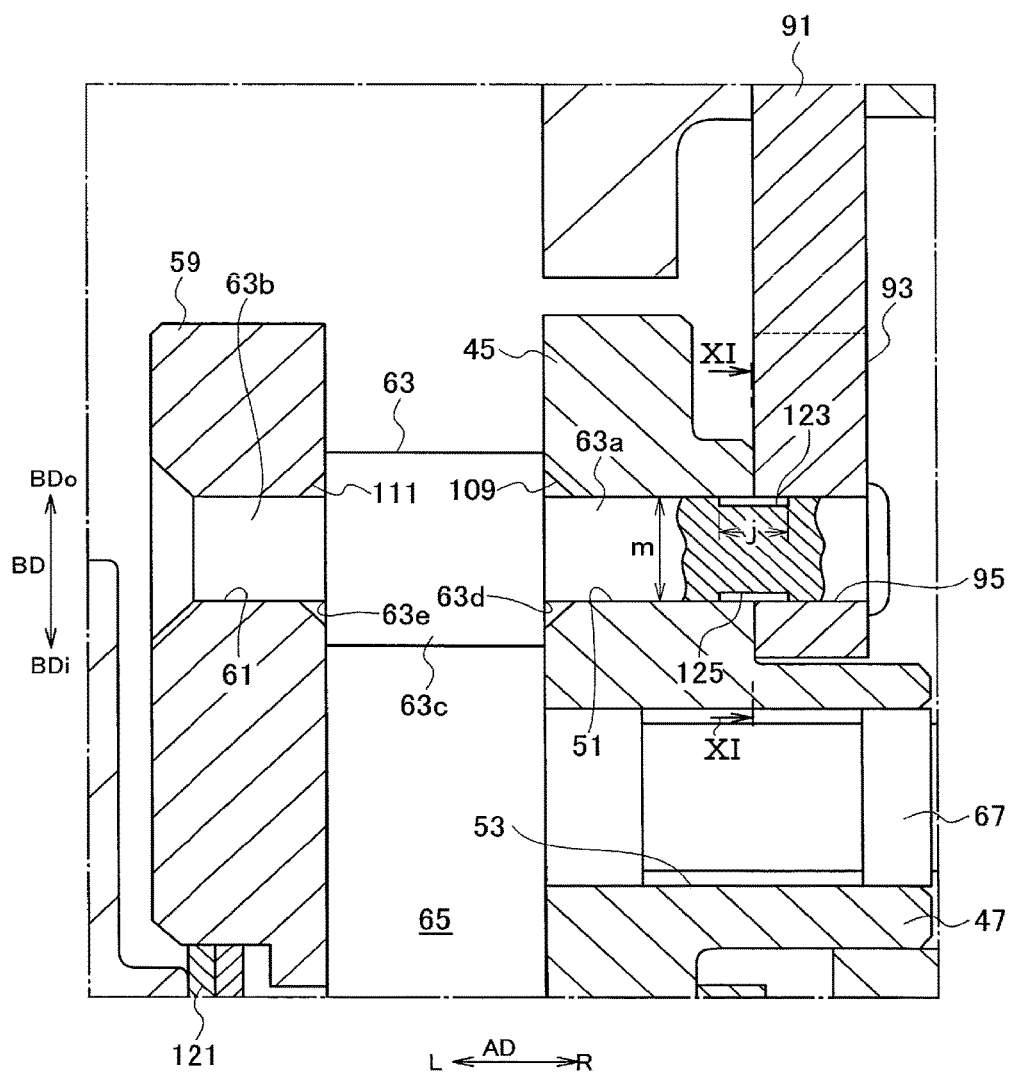
FIG. 10 is a cross-sectional view showing a characteristic part of a modified example of the embodiment of the present disclosure, which is a view corresponding to FIG. 1.
Figure 11A:
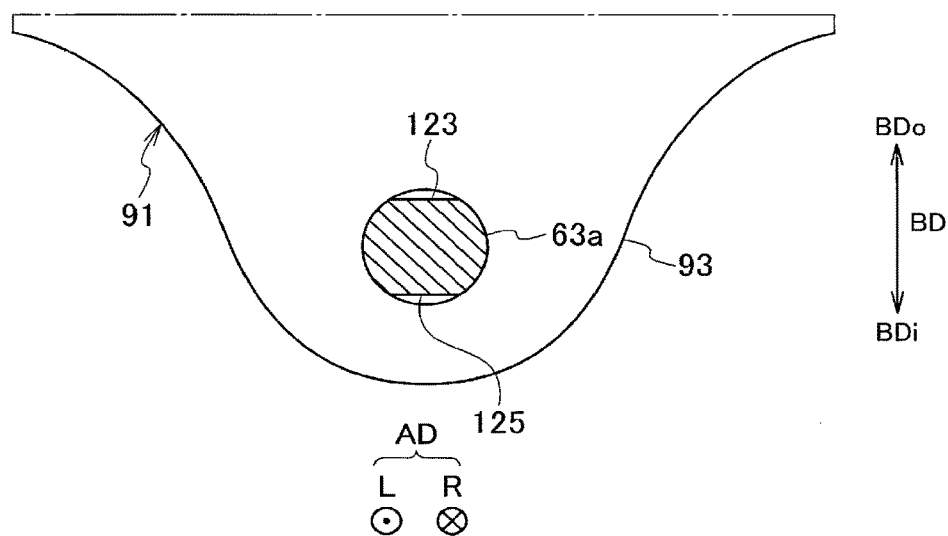
FIG. 11A is a cross-sectional view taken along the XI-XI line in FIG. 10.
Figure 11B:
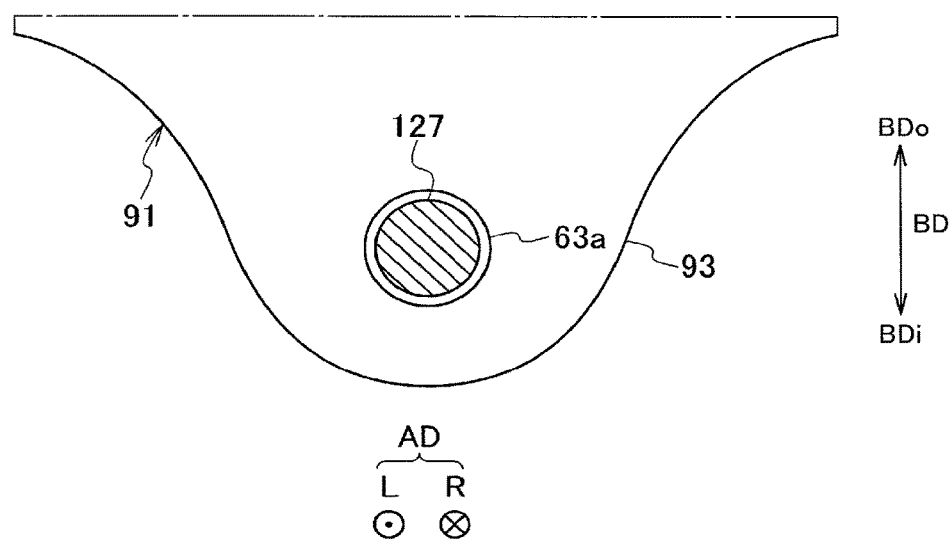
FIG. 11B is a view showing a state in which a chamfer serving as one of the cutouts is formed at a rim on an axially other side of a pin hole in the support ring.

Specifically, as shown in FIG. 10 and FIG. 11A, an outer cutout 123 is formed at a region on the outer side in the radial direction of an outer peripheral surface at the one end portion 63a of each connecting pin 63, the region including an alignment part to be aligned with the boundary position between the first nozzle ring 45 and the support ring 91. An inner cutout 125 is formed at a region on the inner side in the radial direction of the outer peripheral surface at the one end portion 63a of each connecting pin 63, the region including the above-mentioned alignment part. Instead of forming the outer cutout 123 and the inner cutout 125 in the outer peripheral surface of the one end portion 63a of each connecting pin 63, a peripheral groove 127 serving as one of the cutouts may be formed as shown in FIG. 11B in consideration of ease of processing. Here, a length j in the axial direction of each of the outer cutout 123, the inner cutout 125, and the peripheral groove 127 is set equal to or above 0.2 times of the outside diameter m of the one end portion 63a of the connecting pin 63, or preferably equal to or above 0.6 times thereof due to the same reason as the reason for setting the length k in the axial direction of the outer cutout 97 (see FIG. 1) and the like.

Figure 12A:
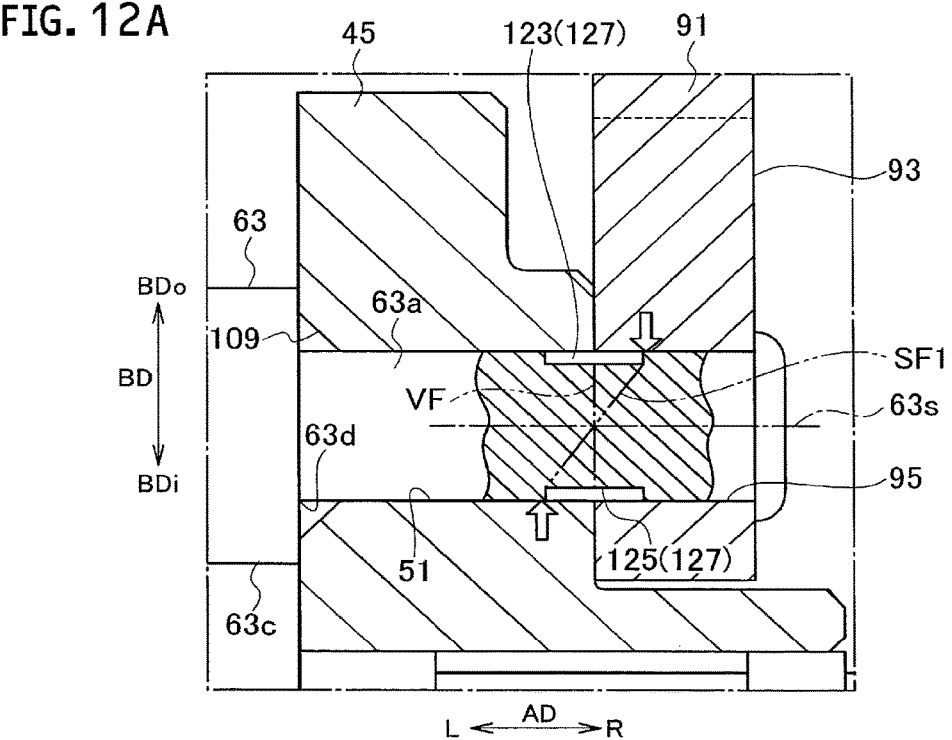
FIG. 12A and FIG. 12B are cross-sectional views to explain operation of the modified example of the embodiment of the present disclosure.

As with the above-described embodiment of the present disclosure, according to the modified example of the embodiment of the present disclosure, if the thermal expansion in the radial direction occurring in the first nozzle ring 45 is greater than the thermal expansion in the radial direction occurring in the support ring 91, then as shown in FIG. 12A, a radially outward shear force is generated from the first nozzle ring 45 and a radially inward shear force is generated from the support ring 91, respectively (see outline arrows), whereby the shear stress acts on the inclined plane (the shear plane) SF1 in the one end portion 63a of the connecting pin 63.

Figure 12B:
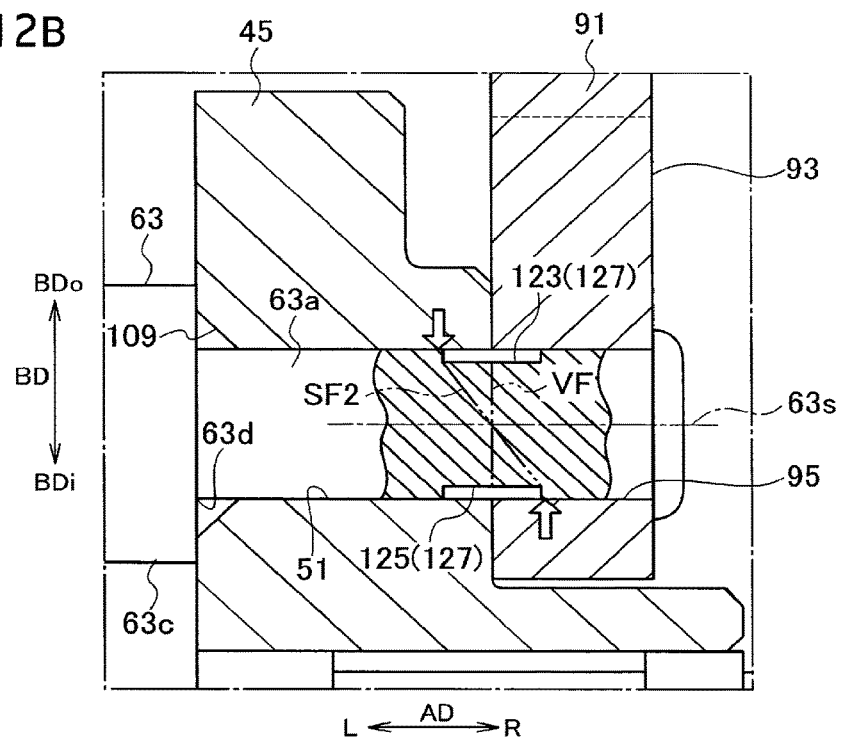

If the thermal expansion in the radial direction occurring in the support ring 91 is greater than the thermal expansion in the radial direction occurring in the first nozzle ring 45, then as shown in FIG. 12B, a radially inward shear force is generated from the first nozzle ring 45 and a radially outward shear force is generated from the support ring 91, respectively (see outline arrows), whereby the shear stress acts on the inclined plane (the shear plane) SF2 in the one end portion 63a of the connecting pin 63. A position of action of the shear force from the first nozzle ring 45 and a position of action of the shear force from the support ring 91 are located away from each other in the axial direction of the connecting pin 63, by amounts corresponding to the outer cutout 123, the inner cutout 125, and so forth.

Thus, the modified example of the embodiment of the present disclosure can also achieve the effect similar to that of the embodiment of the present disclosure described above.

It is to be noted that the present disclosure is not limited to the embodiment described above, but can be embodied in various other aspects, such as an aspect in which at least any of the outer cutouts 97, the inner cutouts 99, the chamfers 101, the outer cutouts 103, the inner cutouts 105, the chamfers 107, the outer cutouts 123, the inner cutouts 125, and the peripheral grooves 127 are formed while omitting formation of the remaining cutouts. In addition, the scope of rights encompassed by the present disclosure is not limited to these embodiments.

According to the present disclosure, it is possible to suppress effects on the shear stress acting on the one end portion of each connecting pin, and to the shear strain, even in the case of the increase in the difference in ambient temperature (the difference in ambient gas temperature) between the first wall member and the support ring when the variable geometry turbocharger is in operation.

What is claimed is:

1. A variable nozzle unit configured to adjust a passage area for an exhaust gas to be supplied to a turbine wheel side of a variable geometry turbocharger, comprising:
    an annular first wall member being disposed inside a turbine housing of the variable geometry turbocharger and concentrically with the turbine wheel, and including a plurality of attachment holes penetratingly formed in the annular first wall member at intervals in a circumferential direction;
    an annular second wall member provided at a position located away from and opposed to the annular first wall member in an axial direction;
    a plurality of connecting pins provided in an integrally connected manner between the annular first wall member and the annular second wall member and arranged at intervals in the circumferential direction, in which one end portion of each connecting pin of the plurality of connecting pins is joined in a state of being inserted into the corresponding attachment hole in the annular first wall member;
    a plurality of variable nozzles disposed between an opposed surface of the annular first wall member and an opposed surface of the annular second wall member at intervals in the circumferential direction, each variable nozzle of the plurality of variable nozzles being turnable in forward and reverse directions around a shaft center parallel to a shaft center of the turbine wheel;
    a link mechanism that is movable in engagement with the annular first wall member or the annular second wall member and configured to synchronously turn the plurality of variable nozzles; and
    a support ring provided on an opposite surface from the opposed surface of the annular first wall member, and integrally connected to the annular first wall member by joining of the one end portions of the plurality of connecting pins, the support ring including:
        a plurality of pin holes to allow insertion of the one end portions of the connecting pins, the pin holes being penetratingly formed so as to be aligned with the plurality of attachment holes in the annular first wall member, wherein a cutout is formed at a region on an outer side in a radial direction and a region on an inner side in the radial direction at a rim on an axially one side of each attachment hole of the plurality of attachment holes in the annular first wall member, and at the region on an outer side in the radial direction and a region on an inner side in the radial direction at a rim on an axially other side of each pin hole of the plurality of pin holes in the support ring, respectively.

2. A variable geometry turbocharger configured to supercharge air to be supplied to an engine side by using energy of an exhaust gas from the engine, comprising:
    the variable nozzle unit according to claim 1.

3. A variable nozzle unit configured to adjust a passage area for an exhaust gas to be supplied to a turbine wheel side of a variable geometry turbocharger, comprising:
    an annular first wall member being disposed inside a turbine housing of the variable geometry turbocharger and concentrically with the turbine wheel, and including a plurality of attachment holes penetratingly formed in the annular first wall member at intervals in a circumferential direction;
    an annular second wall member provided at a position located away from and opposed to the annular first wall member in an axial direction;
    a plurality of connecting pins provided in an integrally connected manner between the annular first wall member and the annular second wall member and arranged at intervals in the circumferential direction, in which one end portion of each connecting pin of the plurality of connecting pins is joined in a state of being inserted into the corresponding attachment hole in the annular first wall member;
    a plurality of variable nozzles disposed between an opposed surface of the annular first wall member and an opposed surface of the annular second wall member at intervals in the circumferential direction, each variable nozzle of the plurality of variable nozzles being turnable in forward and reverse directions around a shaft center parallel to a shaft center of the turbine wheel;
    a link mechanism that is movable in engagement with the annular first wall member or the annular second wall member and configured to synchronously turn the plurality of variable nozzles; and
    a support ring provided on an opposite surface from the opposed surface of the annular first wall member, and integrally connected to the annular first wall member by joining of the one end portions of the plurality of connecting pins, the support ring including:
        a plurality of pin holes to allow insertion of the one end portions of the connecting pins, the pin holes being penetratingly formed so as to be aligned with the plurality of attachment holes in the annular first wall member,
    wherein a chamfer is formed at a rim on an axially one side of each attachment hole of the plurality of attachment holes in the annular first wall member and at a rim on an axially other side of each pin hole of the plurality of pin holes in the support ring, respectively.

4. A variable geometry turbocharger configured to supercharge air to be supplied to an engine side by using energy of an exhaust gas from the engine, comprising:
    the variable nozzle unit according to claim 3.

5. A variable nozzle unit configured to adjust a passage area for an exhaust gas to be supplied to a turbine wheel side of a variable geometry turbocharger, comprising:

an annular first wall member being disposed inside a turbine housing of the variable geometry turbocharger and concentrically with the turbine wheel, and including a plurality of first attachment holes penetratingly formed in the annular first wall member at intervals in a circumferential direction;

an annular second wall member provided at a position located away from and opposed to the annular first wall member in an axial direction;

a plurality of connecting pins provided in an integrally connected manner between the annular first wall member and the annular second wall member and arranged at intervals in the circumferential direction, in which one end portion of each connecting pin of the plurality of connecting pins is joined in a state of being inserted into the corresponding first attachment hole in the annular first wall member;

a plurality of variable nozzles disposed between an opposed surface of the annular first wall member and an opposed surface of the annular second wall member at intervals in the circumferential direction, each variable nozzle of the plurality of variable nozzles being turnable in forward and reverse directions around a shaft center parallel to a shaft center of the turbine wheel;

a link mechanism that is movable in engagement with the annular first wall member or the annular second wall member and configured to synchronously turn the plurality of variable nozzles; and a support ring provided on an opposite surface from the opposed surface of the annular first wall member, and integrally connected to the annular first wall member by joining of the one end portions of the plurality of connecting pins, the support ring including:

a plurality of pin holes to allow insertion of the one end portions of the connecting pins, the pin holes being penetratingly formed so as to be aligned with the plurality of first attachment holes in the annular first wall member, wherein a plurality of second attachment holes are penetratingly formed in the annular second wall member so as to be aligned with the plurality of first attachment holes in the annular first wall member, wherein another end portion of each connecting pin of the plurality of connecting pins is joined in a state of being inserted into the corresponding second attachment hole in the annular second wall member, and wherein a chamfer is formed at at least one of a rim on an axially one side of each second attachment hole of the plurality of second attachment holes in the annular second wall member and a rim on an axially other side of each first attachment hole of the plurality of first attachment holes in the annular first wall member.

6. A variable geometry turbocharger configured to supercharge air to be supplied to an engine side by using energy of an exhaust gas from the engine, comprising:

the variable nozzle unit according to claim 5.

* * * * *